United States Patent Office 3,408,824
Patented Nov. 5, 1968

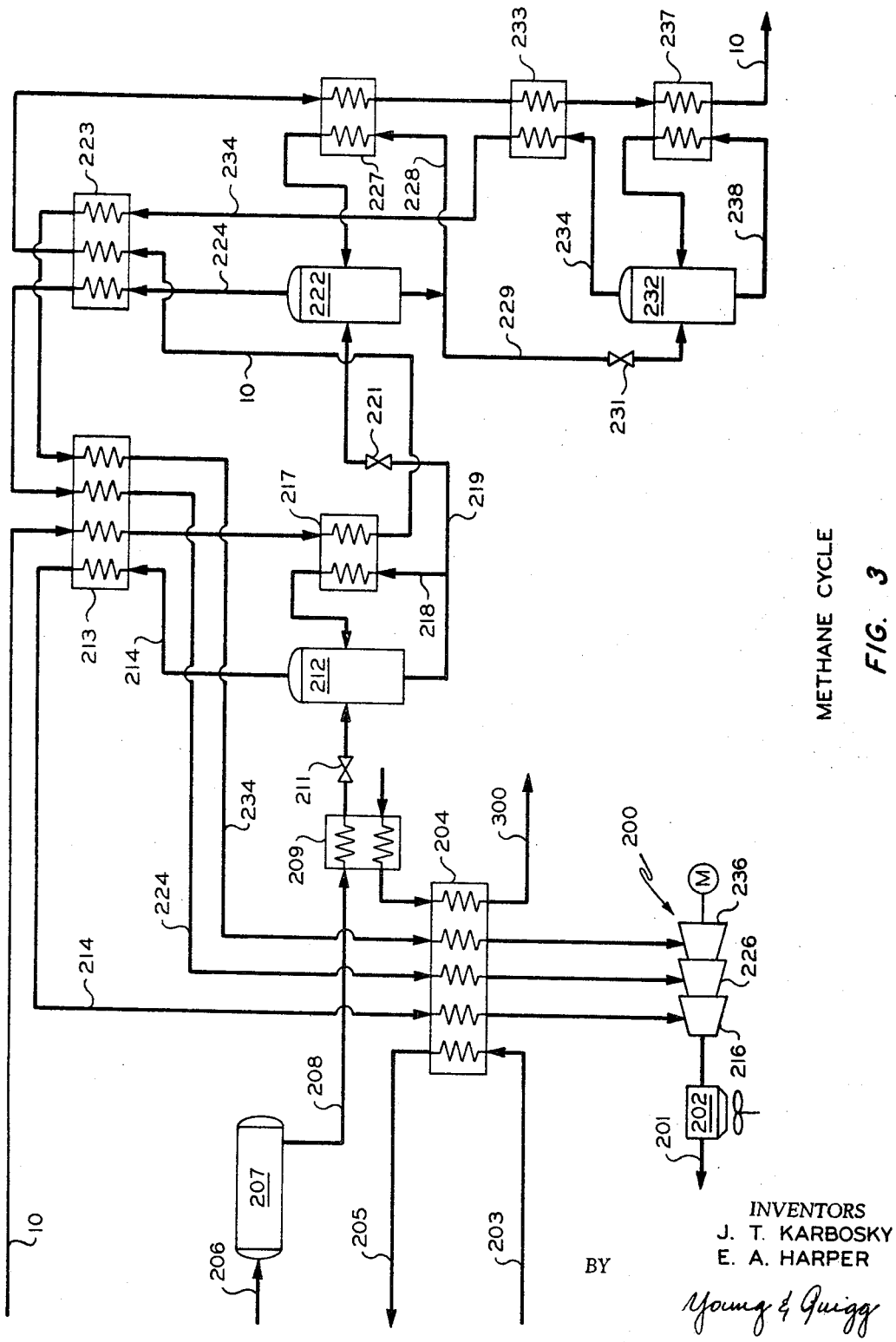

3,408,824
GAS LIQUEFICATION EMPLOYING THERMO-SYPHONED EXTERNAL LIQUID REFRIGERANT
Joseph T. Karbosky and Ernest A. Harper, Bartlesville, Okla., assignors to Phillips Petroleum Company, a corporation of Delaware
Filed Mar. 31, 1967, Ser. No. 627,544
6 Claims. (Cl. 62—9)

ABSTRACT OF THE DISCLOSURE

A gaseous feed stream is cooled and liquefied by employing external refrigeration in which the refrigerant is expanded in series to provide plural vapor and liquid portions of refrigerant in plural flash zones. Each vapor and liquid portion of refrigerant is passed in heat-exchange with the gaseous feed stream with the liquid portion passing upwardly through the heat exchange zone by thermosyphonic effect and returning to the respective flash zone.

---

This invention relates to the liquefaction of gases. In another aspect, the invention relates to a cycle for the refrigeration of natural gas. Another aspect of this invention relates to a method of circulating refrigerant.

In the liquefaction of a gas, such as a natural gas, methane, nitrogen, oxygen, and the like, by low temperature refrigeration to produce liquefied gas for storage, transportation, or for use in the separation process, it is important to obtain maximum efficiency. By operating at maximum efficiency during a refrigeration cycle, power and equipment costs are kept at a minimum.

According to the invention, a gas stream is liquefied by compressing and condensing a refrigerant, vaporizing a first portion of the condensed refrigerant in a first flash zone to form a vapor phase and a liquid phase and heat exchanging the vapor with the gas stream in a first heat exchange zone, heat exchanging a portion of liquid refrigerant from the first flash zone with the gas stream in a second heat exchange zone and passing the refrigerant back to the first flash zone.

Further, according to the invention a portion of the liquid refrigerant is passed from the first flash zone to a second flash zone, a portion of a refrigerant is vaporized in the second flash zone and the vapor formed is heat exchanged with the gas stream in a third heat exchange zone, then passed to the first heat exchange zone where it is heat exchanged with the gas stream, and liquid refrigerant from the second flash zone is heat exchanged with the gas stream in a fourth heat exchange zone and passed back to the second flash zone. The flash zones operate at successively lower pressures and the gas stream flows successively through the series of heat exchange zones. More than two flash zones and their associated heat exchange zones can be utilized, for example, liquid refrigerant from the second flash zone can be passed to a third lower pressure flash zone wherein a portion is vaporized and the vapor heat exchanged with the gas stream in a fifth heat exchange zone, then passed to and heat exchanged with the gas stream in the third and first heat exchange zones, while a portion of the liquid refrigerant from the third flash zone is heat exchanged with the gas stream in a sixth heat exchange zone and passed back to the third flash zone.

Further, in accordance with the invention liquid refrigerant from a flash zone is fed through a heat exchange zone and back to the flash zone by utilizing the difference in refrigerant densities as a motive force. The condensed refrigerant in the flash zone has a greater density and exerts a greater liquid head than a comparable volume of refrigerant which is warmed and partially vaporized when it is passed in heat exchange with the gas stream. This difference in density is utilized to effect a flow of the two-phase (vapor-liquid) refrigerant fluid back into the flash zone. In one embodiment, the vaporized portion of the recycled refrigerant is combined with the vapor portion resulting from the pressure reduction in the flash zone and the combined vapors are heat exchanged with the gas stream in another heat exchange zone.

In one embodiment, a natural gas is liquefied and cooled in a cascade arrangement wherein three vapor compression cycles are employed in series; the first cycle utilizing propane refrigerant; the second cycle utilizing ethylene refrigerant; and the third cycle utilizing methane refrigerant. In each of these cycles, the compressed refrigerant is expanded at successively lower pressures to cool the refrigerant. In the first cycle, liquid propane is heat exchanged with the natural gas; in the second cycle, ethylene vapors and liquid are heat exchanged with the natural gas; and in the third cycle, methane vapors are liquid heat exchanged with the natural gas. In each cycle, the vaporized refrigerant is compressed stagewise; the highest pressure refrigerant vapors returning to the highest stage of compression; the intermediate stage pressure vapors returning to an intermediate stage of compression and the lower pressure vapors returning to the lower stage of compression.

Accordingly, it is an object of the invention to efficiently and economically liquefy a gas, such as natural gas.

Another object of the invention is to provide a process for the liquefaction of a gas having a minimum refrigerant horsepower requirement.

Another object is to reduce the amount of equipment necessary to heat exchange fluids.

These and other objects will be apparent to one skilled in the art upon consideration of the written description of the figures and the appended claims.

FIGURE 3 is a continuation of the flow diagram of FIGURE 2.

Figure 1:
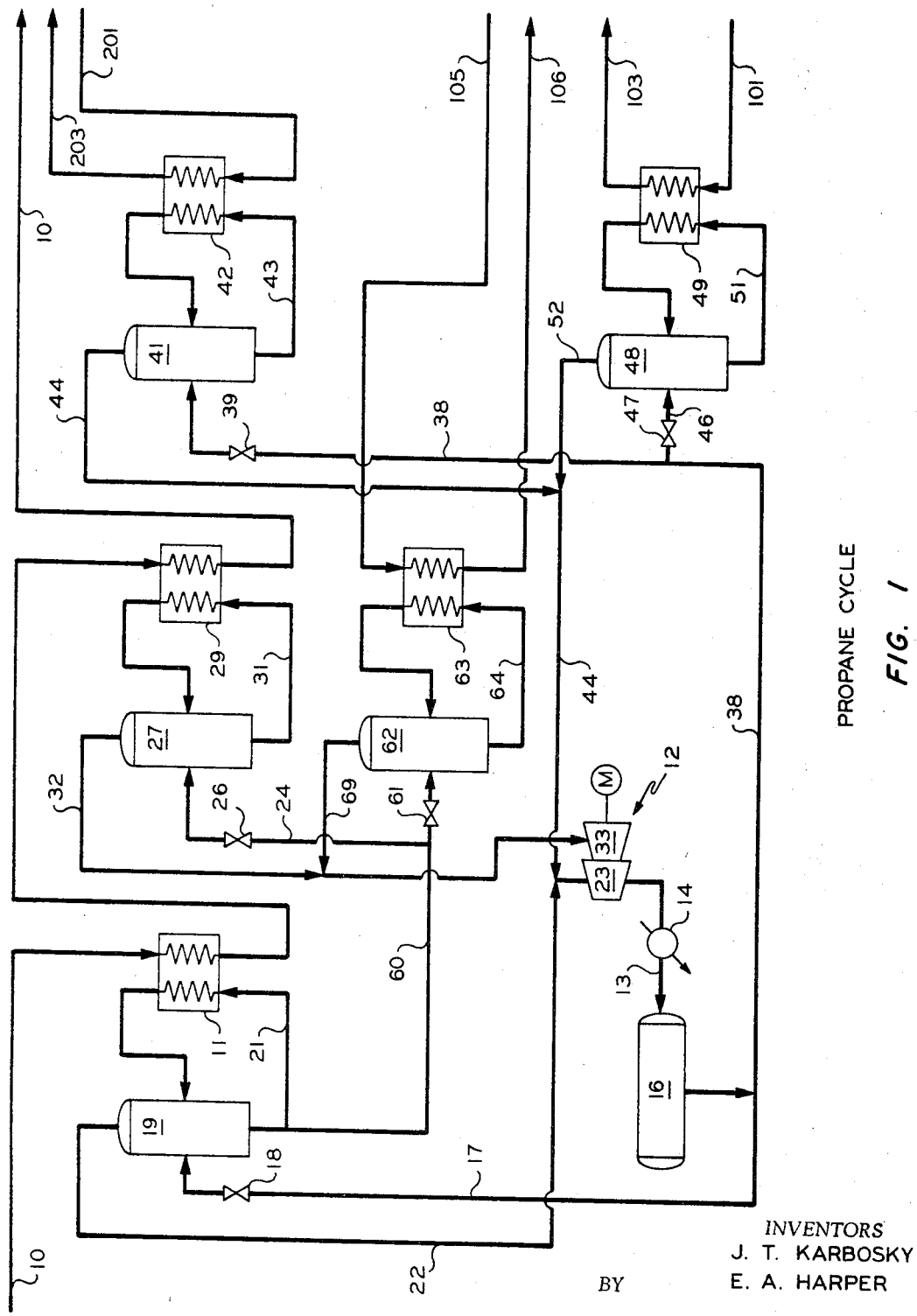
FIGURE 1 is a partial flow diagram of one embodiment of the invention.

While the invention is applicable to the liquefaction of various gases, such as nitrogen, oxygen, and air, for purposes of illustration, the invention will be described in terms of liquefying a natural gas comprising substantially pure (99%) methane.

In the embodiment illustrated in the drawings, the refrigeration cycle for liquefaction and cooling of natural gas is a modified expansion system in a cascade arrangement. A cascade arrangement is one in which a plurality of refrigeration cycles are connected in series, each of the cycles, except the first, employing a refrigerant with a lower boiling point than the refrigerant of the preceding cycle. In an expansion refrigeration system a compressed gas is expanded or a condensed refrigerant is vaporized to cool the same.

The liquefaction system will be divided into a sequence of refrigeration cycles including a propane refrigeration cycle, an ethylene refrigeration cycle, and a methane refrigeration cycle, each of which is adapted to attain a temperature reduction of the compressed refrigerant where each subdivision of the cycle is operated with a minimum of refrigeration horsepower. An operative set of conditions, temperature, and pressure are used to illustrate each cycle, but it should be understood that these may vary with the character of the gas, the design and capacity of the apparatus, types of refrigerant, and the like.

*Propane cycle*

Referring to the drawings, in the propane cycle, FIG-

URE 1, natural gas from which water, gasoline components and carbon dioxide have been removed, is passed through conduit 10 at about 600 p.s.i.g. to a heat exchange zone 11. Propane is compressed to about 130 p.s.i.g. in a compressor 12 and passed via conduit 13 through condensor 14, where the propane is condensed by heat exchange with water, to a surge tank 16. Liquid propane, at 75° F., is passed from surge tank 16 via conduit 17 and flashed through valve 18 into flash zone 19, which is maintained at about 42 p.s.i.g. Flash zones are zones of reduced pressure, being at a lower pressure than the incoming fluid, so that a portion of the refrigerant is vaporized, effecting a reduction in temperature. Liquid propane at about 22° F. is passed via conduit 21 through heat exchange zone 11 and back to flash zone 19 by utilizing the siphoning effect resulting from the different densities of the cold liquid propane in the flash zone and the propane in the heat exchanger. This method of recycling refrigerant to a flash zone will be hereinafter referred to as "thermosiphoning." Vapors at 42 p.s.i.g. are removed from flash zone 19 and passed through conduit 22 to the high stage compression 23 of compressor 12.

Liquid propane at 42 p.s.i.g. is passed from flash zone 19 via conduits 60 and 24 and flashed through valve 26 into a flash zone 27 which is maintained in about −25° F. and 8 p.s.i.g. The natural gas at 30° F. flows from heat exchange zone 11 through conduit 10 to heat exchange zone 29. Liquid propane is passed via conduit 31 through heat exchange zone 29 and back into flash zone 27 by thermosiphoning. Propane vapors at about 8 p.s.i.g. flow through conduit 32 to the low stage compression 33 of compressor 12. The natural gas flows from heat exchange zone 29 at −17° F. to be further cooled in ethylene refrigeration cycle which will be hereinafter described.

To cool and condense the ethylene and methane refrigerants used in subsequent cycles of the illustrated refrigeration system, liquid propane is passed from surge tank 16 via conduit 38 through valve 39 into a flash zone 41 which is maintained at 42 p.s.i.g. Compressed methane refrigerant at 93° F. from a downstream methane compressor is passed to heat exchange zone 42 via conduit 201. Propane at 42 p.s.i.g. is passed via conduit 43 through heat exchange zone 42 and back into flash zone 41 by thermosiphoning. Methane, cooled to 30° F. in heat exchange zone 42, is removed via conduit 203 for downstream heat exchange steps. Propane vapors at 42 p.s.i.g. are passed from flash zone 41 via conduit 44 to higher stage 23 of compressor 12.

Propane liquid at about 75° F. and 130 p.s.i.g. is passed from surge tank 16 via conduits 38 and 46 through valve 47 into flash zone 48 which is maintained at 22° F. and 42 p.s.i.g. Compressed ethylene refrigerant at 93° F. from a downstream ethylene compressor passes through conduit 101 to heat exchange zone 49. Propane liquid is thermosiphoned via conduit 51 through heat exchange zone 49. Ethylene refrigerant is removed from heat exchange zone 49 via conduit 103. Propane vapors from flash zone 48 are passed via conduits 52 and 44 to high stage 23 of compressor 12.

A portion of the liquid propane from a flash zone 19 is passed via conduit 60 through valve 61 into a flash zone 62, maintained at 8 p.s.i.g. Compressed ethylene refrigerant is passed through conduit 105 to heat exchange zone 63. Liquid propane at −25° F. is thermosiphoned through heat exchange 63 via conduit 64 and propane vapor at 8 p.s.i.g. is passed via conduit 69 to the lower stage 33 of compressor 12. Ethylene refrigerant at −17° F. is passed via conduit 106 to an ethylene surge tank 107.

The propane vapors returned to compressor 12 are compressed stagewise, condensed and returned to surge tank 16, thus completing the propane refrigeration cycle.

During the propane refrigeration cycle of the cascade refrigeration system, sensible heat is removed from the gaseous natural gas and refrigerants used in subsequent cycles are cooled.

*Ethylene cycle*

Figure 2:
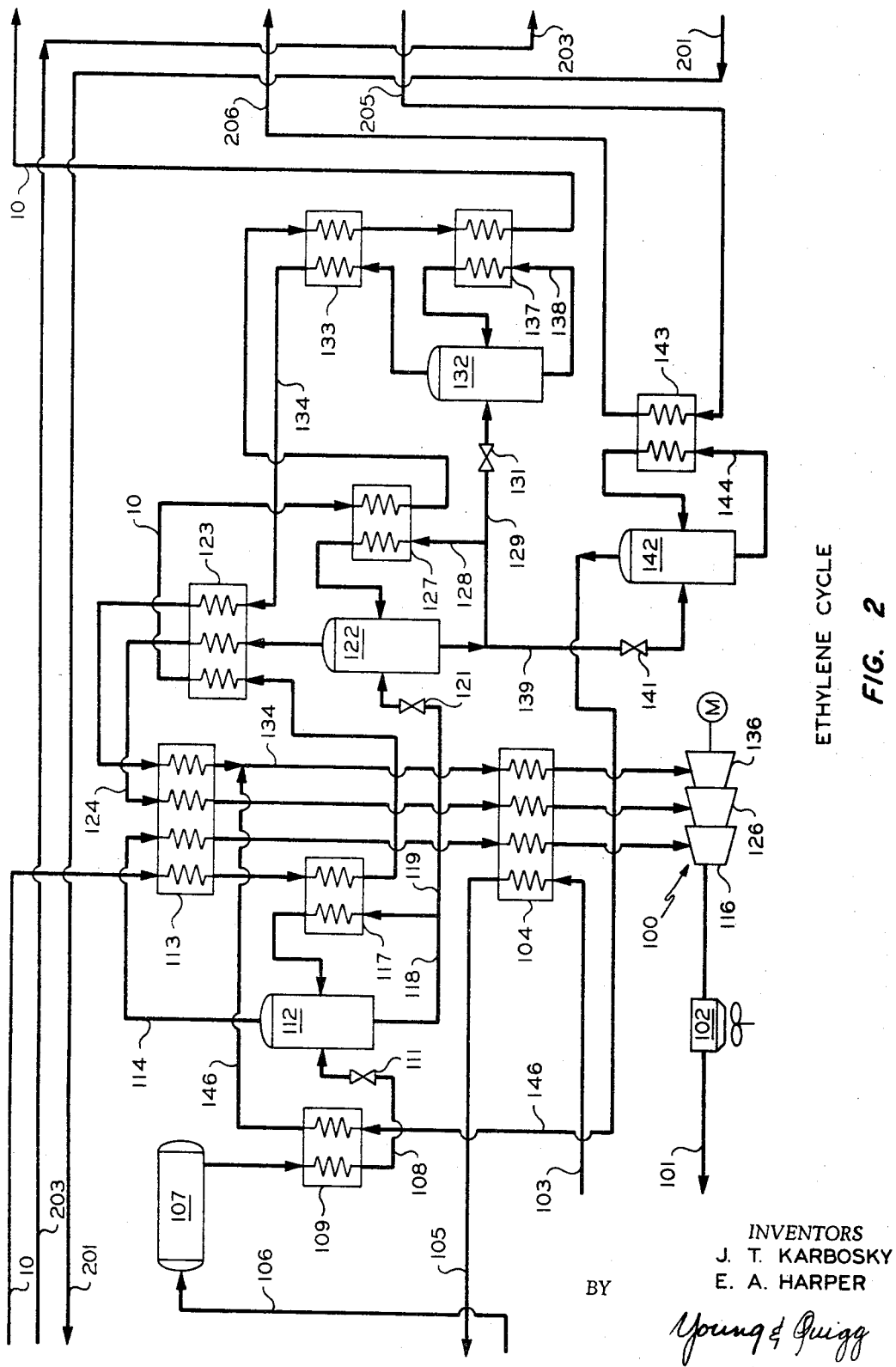
FIGURE 2 is a continuation of the flow diagram in FIGURE 1.

In FIGURE 2, ethylene is compressed to about 320 p.s.i.g. in a multistage compressor 100 and is passed via conduit 101 through an air fin cooler 102, wherein it is cooled to about 93° F., to heat exchange zone 49 in the propane cycle. Ethylene refrigerant is removed from heat exchange zone 49 and passed via conduit 103 to heat exchange zone 104 wherein it is further cooled by heat exchange with ethylene vapors which are being returned to compressor 100. The ethylene refrigerant flows from zone 104 via conduit 105 to heat exchange zone 63 (FIGURE 1) wherein it is cooled by heat exchange with liquid propane, as previously described. From heat exchange zone 63, the ethylene is passed through conduit 106 to a surge tank 107. Liquid ethylene at about −17° F. and 320 p.s.i.g. is removed from surge tank 107 via conduit 108 through heat exchange zone 109 and flashed through valve 111 into a flash tank 112, which is maintained at about −70° F. and 108 p.s.i.g.

The natural gas stream is passed from the propane refrigeration cycle through conduit 10 to a heat exchange zone 113. Ethylene vapors at 108 p.s.i.g. from flash zone 112 are passed via conduit 114 through heat exchange zone 113, and then through heat exchange zone 104 to high-stage compression 116 of compressor 100. The natural gas is passed from heat exchange zone 113 to heat exchange zone 117. Liquid ethylene is passed via conduit 118 through heat exchange zone 117 and back to flash zone 112 by thermosiphoning.

Liquid ethylene is removed from flash zone 112 and passed via conduit 119 through valve 121 into a flash zone 122, which is maintained at about −108° F. and 39 p.s.i.g. Natural gas at −62° F. is passed from heat exchange zone 117 through conduit 10 to a heat exchange zone 123. Ethylene vapors at 39 p.s.i.g. are passed via conduit 124 to heat exchange zone 123, then to heat exchange zone 113, then through heat exchange zone 104 to the intermediate-stage of compression 126 of compressor 100. The natural gas stream is passed from heat exchange zone 123 to heat exchange zone 127. Liquid ethylene is passed via conduit 128 through heat exchange zone 127 and back into flash zone 122 by thermosiphoning.

A portion of the liquid ethylene in flash zone 122 is passed via conduit 129 through valve 131 into a flash zone 132 which is maintained at about −134° F. and 13 p.s.i.g. Natural gas is removed from heat exchange zone 127 at −101° F. and passed through conduit 10 to heat exchange zone 133. Ethylene vapors at 13 p.s.i.g. are removed from flash zone 132 and passed via conduit 134 successively through heat exchange zones 133, 123, 113, and 104 to the low-stage compression 136 of compressor 100. Natural gas flows from heat exchange zone 133 to heat exchange zone 137. Liquid ethylene is passed via conduit 138 through heat exchange zone 137 and back into flash zone 132 by thermosiphoning.

A portion of the liquid ethylene from flash zone 122 is used to cool the methane refrigerant employed in the subsequent cycle. Liquid ethylene is passed via conduit 139 and flashed through valve 141 into a flash zone 142 which is maintained at 13 p.s.i.g. Compressed methane from a downstream methane compressor 200 flows through conduit 205 to heat exchange zone 143. Liquid ethylene at 13 p.s.i.g. is passed via conduit 144 through heat exchange zone 143 and back into flash zone 142 by thermosiphoning. Ethylene vapors at 13 p.s.i.g. are passed via conduit 146 to heat exchange zone 109 to cool the liquid ethylene being removed from surge tank 107. From heat exchange zone 109, the vapors in conduit 146 are passed to conduit 134 and combined with the vapors flowing to the low pressure stage 136 of compressor 100.

The ethylene vapors are compressed, cooled, condensed, and passed to the surge tank to complete the ethylene refrigeration cycle. During the ethylene cycle, substantially all of the latent heat of condensation is removed from the natural gas.

Methane cycle

Referring now to the methane refrigeration cycle, FIGURE 3, methane refrigerant is compressed to about 585 p.s.i.g. in methane compressor 200 and passed via conduit 201 through an air fin cooler 202 to heat exchange zone 42 in the propane cycle (FIGURE 1). Methane refrigerant at 30° F. is removed from heat exchange zone 42 and passed via conduit 203 to heat exchange zone 204 where it is further cooled by heat exchange with methane vapors which are being returned to compressor 200. From heat exchange zone 204, the compressed methane is passed via conduit 205 to heat exchange zone 143 (FIGURE 2) where it is cooled to about −126° F. by heat exchange with liquid ethylene. The condensed methane refrigerant is removed from heat exchange zone 143 and passed via conduit 206 to a surge tank 207. Liquid methane at 585 p.s.i.g. is removed from surge tank 207 via conduit 208 through heat exchange zone 209 and flashed through valve 211 into flash tank 212 which is maintained at about −218° F. and 174 p.s.i.g.

Natural gas is passed from the ethane refrigeration cycle at −126° F. via conduit 10 to heat exchange zone 213. Methane vapors at 174 p.s.i.g. from flash zone 212 are passed via conduit 214 through heat exchange zones 213 and 204 to high-stage compression 216 of compressor 200. The natural gas is passed from heat exchange zone 213 to heat exchange zone 217. Liquid methane at 174 p.s.i.g. is passed via conduit 218 through exchange zone 217 back to flash zone 212 by thermosiphoning.

Liquid methane from flash zone 212 is passed via conduit 219 and flashed through valve 221 into flash zone 222 which is maintained at about −218° F. and 53 p.s.i.g. Natural gas at −172° F. is passed from heat exchange zone 217 via conduit 10 to heat exchange zone 223. Methane vapors at 53 p.s.i.g. are passed from flash zone 222 via conduit 224 successively through heat exchange zones 223, 213, and 204 to intermediate-stage compression 226 of methane compressor 200. The natural gas stream is passed from heat exchange zone 223 to heat exchange zone 227. Liquid methane at −218° F. is passed from flash zone 222 via conduit 228 through heat exchange zone 227 and back into flash zone 2 by thermosiphoning.

Liquid methane from flash zone 22 is passed via conduit 229 through valve 231 into flash zone 232 which is maintained at about −240° F. and 17 p.s.i.g. Natural gas is removed from heat exchange zone 227 at −210° F. and passed via conduit 10 to heat exchange zone 223. Methane vapors at 17 p.s.i.g. from flash zone 232 are passed via conduit 234 successively through heat exchange zones 233, 223, 213, and 204 to the lower-stage compression 236 of compressor 200. The natural gas stream flows from heat exchange zone 233 to heat exchange zone 237. Liquid methane at 17 p.s.i.g. is passed via conduit 238 through heat exchange zone 237 and back to flash zone 232 by thermosiphoning.

Liquefied natural gas is removed from heat exchanger 237 at −232° F. and 600 p.s.i.g. via conduit 10 for storage, transportation, or further processing. In some instances it is desirable to store or transport the liquefied natural gas in insulated containers at slightly above atmospheric pressure but not at such high pressure as to unduly increase the cost of the container. When this is done the high pressure liquefied natural gas must be flashed to the desired low pressure, effecting a further temperature reduction. Vapors from the liquefied natural gas flash step, not shown, can be passed via conduit 300 through heat exchange zones 209 and 204 to cool the compressed methane and then be used for fuel for the refrigeration compressors and other equipment.

The invention has been described in detail with temperatures and pressures applicable to a natural gas stream containing about 99.5 mol percent methane. If a wet gas stream is to be refrigerated, provision should be made to withdraw, as liquids, compounds such as benzene and carbon dioxide which would solidify at the low temperatures contemplated. Such liquids can be tapped off from the heat exchangers at appropriate points of temperature and pressure. For the sake of clarity in the drawing, auxiliary equipment such as lubricating oil condensers, dessicators, and the like have been omitted from the drawing.

Propane, ethylene, and methane have been chosen as the refrigerants in the cascaded system in the specific embodiment of the invention described; however, other refrigerants such as ammonia, freons, and the like, can be utilized if desired. Hydrocarbons are preferred as refrigerants because of their availability in connection with the natural gas liquefication and because of the range of hydrocarbons available for use as refrigerants.

It can be seen that in the ethylene and propane cycles, each flash zone has two heat exchange zones associated therewith. By heat exchanging the natural gas stream with both refrigerant vapors and refrigerant liquid in associated heat exchange zones as embodied in the ethylene and methane cycles, the gas is liquefied with lower power requirements and therefore at lower costs. By utilizing thermosiphoning of liquid refrigerant as embodied in all three cycles of the cascade system described, it is possible to eliminate many pumps and further reduce the capital and operating costs of such a refrigeration system.

Reasonable modification and variation are within the scope of this invention which describes a novel method of liquefying gases.

That which is claimed is:

1. A method of liquefying a gas stream comprising:
  passing said gas stream successively through a plurality of heat exchange zones;
  compressing and liquefying a refrigerant;
  passing said liquid refrigerant to a flash zone, which is maintained at predetermined pressure, and vaporizing a portion of said refrigerant in said zone;
  heat exchanging said vaporized refrigerant portion with said gas stream in a first heat exchange zone to cool said gas stream;
  passing a portion of said liquid refrigerant from said flash zone upwardly through a second heat exchange zone in heat exchange with said cooled gas stream to further cool the gas stream and directly passing the liquid and vapor refrigerant back to said flash zone by thermosyphonic effect, the circulation of said refrigerant through said second heat exchange zone being accomplished solely by the force of the thermosyphon.

2. The method of claim 1 wherein a plurality of flash zones are utilized including:
  passing liquid refrigerant from said flash zone to a second lower pressure flash zone and vaporizing a second portion of said refrigerant in said second flash zone;
  heat exchanging said second vapor portion with said gas stream in a third heat exchange zone, then heat exchanging said second vapor portion with said gas stream in said first heat exchange zone;
  passing a portion of said liquid refrigerant from said second flash zone through a fourth heat exchange zone in heat exchange with said gas stream, then back to said second flash zone;
  passing liquid refrigerant from said second flash zone to a third lowest pressure flash zone and vaporizing a third portion of said refrigerant in said third flash zone;
  heat exchanging said third vapor portion with said gas stream in a fifth heat exchange zone, then heat exchanging said third vapor portion with said gas stream in said third heat exchange zone, then heat exchanging said third vapor portion with said gas stream in said first heat exchange zone; and
  passing a portion of said liquid refrigerant from said third flash zone through a sixth heat exchange zone in heat exchange with said gas stream, then back to said third flash zone.

3. The method of claim 2 wherein said gas stream comprises natural gas.

4. The method of claim 2 wherein a plurality of refrigerants are cascaded in separate refrigeration cycles and each condensed refrigerant is vaporized at successively lower pressures.

5. The method of claim 4 wherein said refrigerants are ethylene and methane.

6. The method of claim 5 including cooling said gas stream by heat exchange with liquid propane prior to passing said gas stream to said ethylene and methane refrigeration cycles.

References Cited

UNITED STATES PATENTS

| | | | |
|---|---|---|---|
| 2,258,015 | 10/1941 | Keith | 62—23 XR |
| 2,265,527 | 12/1941 | Hill | 62—23 |
| 3,020,723 | 2/1962 | DeLury | 6—40 XR |
| 3,315,477 | 4/1967 | Carr | 62—40 XR |
| 3,364,685 | 1/1968 | Perret | 62—40 XR |

NORMAN YUDKOFF, *Primary Examiner.*

V. W. PRETKA, *Assistant Examiner.*